United States Patent
Lee

[15] 3,641,606
[45] Feb. 15, 1972

[54] CARWASHING MACHINE

[72] Inventor: James L. Lee, Missoula, Mont.
[73] Assignee: Brush-A-Matic, Inc., Missoula, Mont.
[22] Filed: Sept. 22, 1969
[21] Appl. No.: 860,003

[52] U.S. Cl. ............................................ 15/21 E, 15/DIG. 2
[51] Int. Cl. ........................................................... B60s 3/06
[58] Field of Search .................. 15/DIG. 2, 21 E, 53, 97, 302; 134/6

[56] References Cited

FOREIGN PATENTS OR APPLICATIONS

| | | | |
|---|---|---|---|
| 1,440,955 | 4/1966 | France | 15/DIG. 2 |
| 1,007,801 | 10/1965 | Great Britain | 15/DIG. 2 |

*Primary Examiner*—Edward L. Roberts
*Attorney*—Wells, St. John & Roberts

[57] ABSTRACT

An apparatus and process for washing vehicles, particularly private sedans and station wagons. The apparatus comprises a carriage mounted about an enclosed track. The carriage moves about the periphery of a stationary vehicle. It supports a yieldable upright brush that engages the vehicle sides and a yieldable upper horizontal brush that engages the vehicle upper surfaces. Means is provided to lift the upper brush while the carriage moves across the rear of the vehicle. The washing process includes the step of lifting the brush and maintaining it at an elevated position as the brush traverses the rear of the vehicle.

3 Claims, 8 Drawing Figures

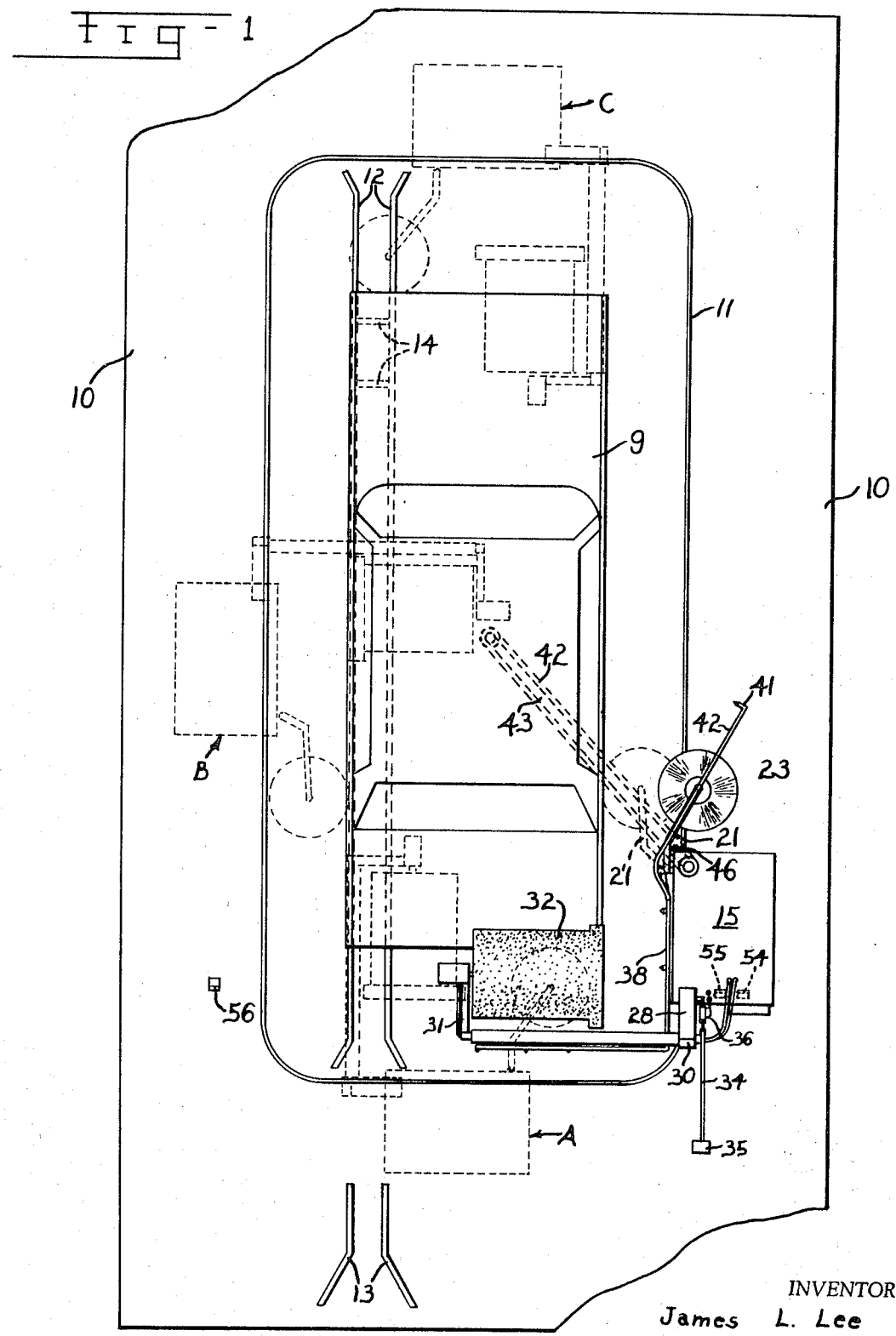

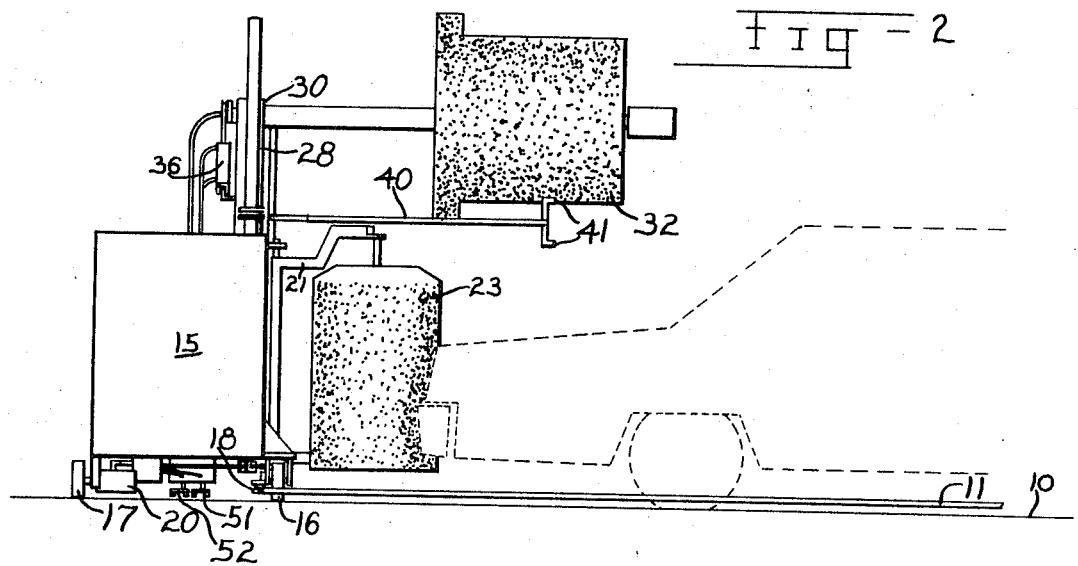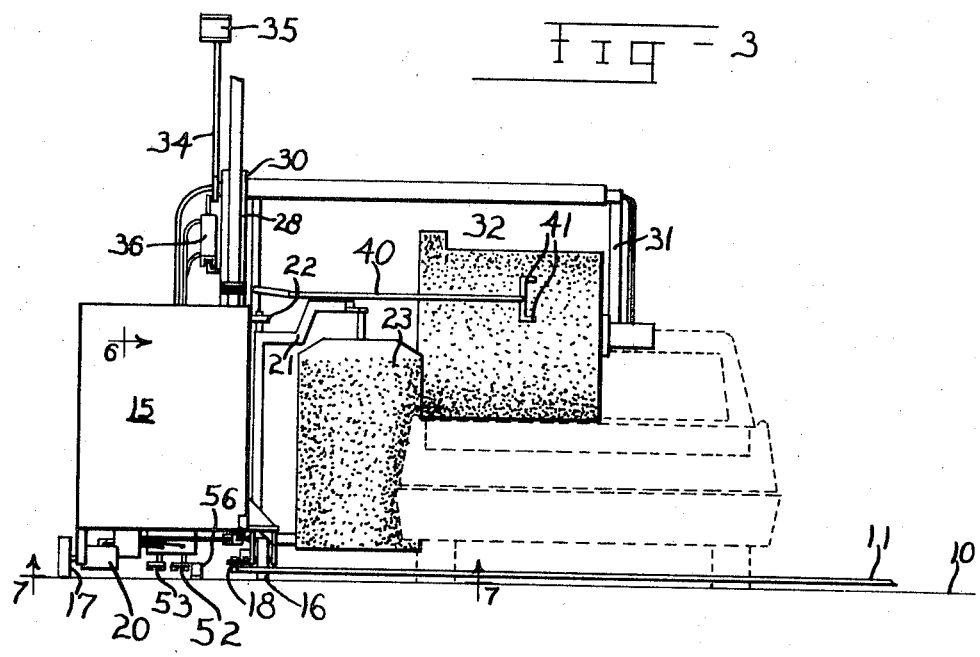

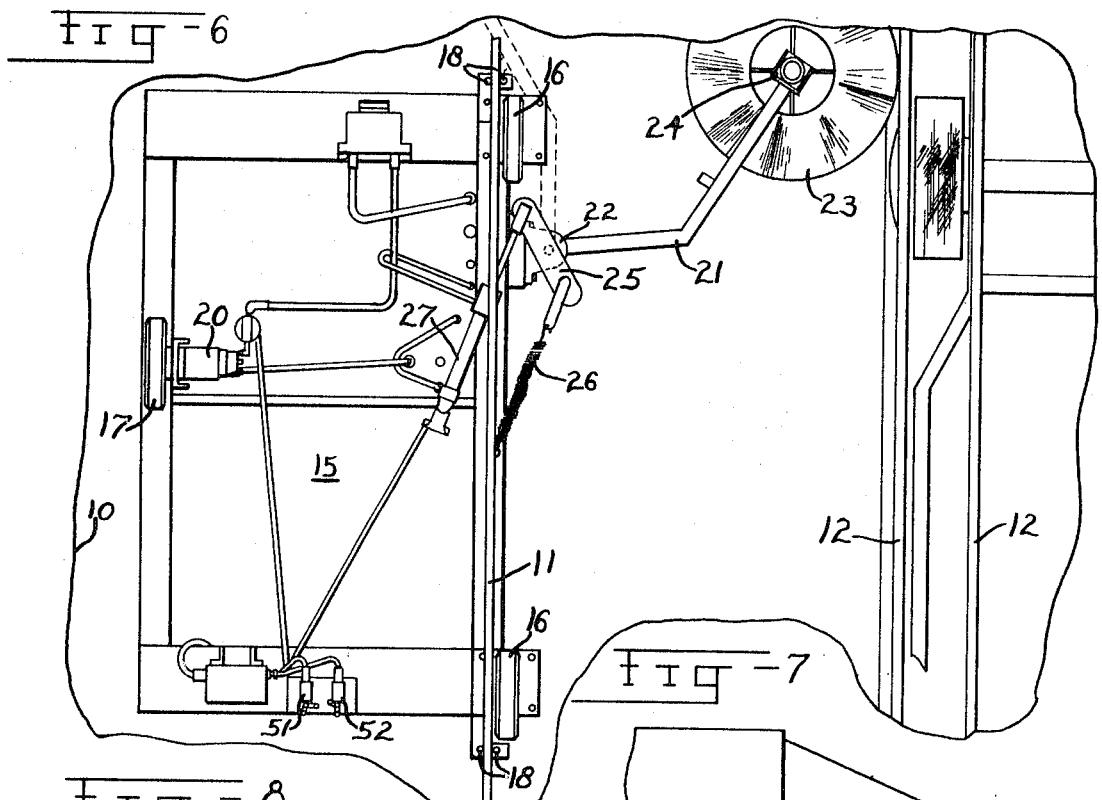
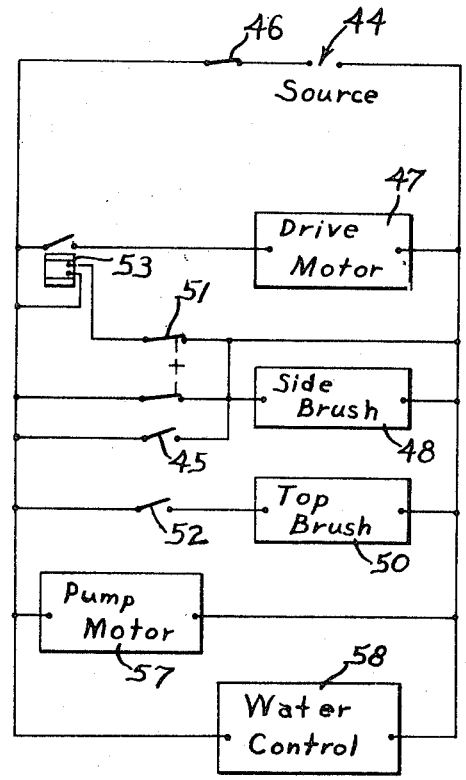
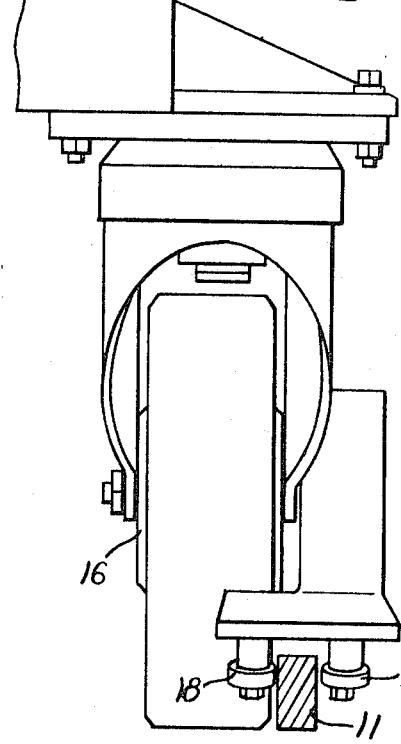
INVENTOR.
James L. Lee
BY
Wells, St. John & Roberts
Attys

CARWASHING MACHINE

BACKGROUND OF THE INVENTION

This invention relates to an apparatus for washing vehicles. It is specifically designed for the washing of conventional passenger sedans and station wagons. It comprises a specific improvement over prior devices using the basic principles included herein.

The prior art discloses a brush and spray apparatus including a carriage that moves about the periphery of a centrally located vehicle. In the disclosure of the prior art, a vertical side brush and a horizontal top brush are biased toward the vehicle during the entire cycle of movement of the carriage about the vehicle. In practice, such an arrangement poses operational difficulties with respect to the maintenance of the top brush. This is due to the varying contours of passenger vehicles along the rear vehicle surfaces. It is also due to the wide variety of attachments commonly mounted to station wagons, particularly horizontal and vertical wind deflectors designed to direct air across the rear of such vehicles. Such attachments often become entangled in the fibers of the horizontal brush as the brush is being turned to traverse the rear of the vehicle. This results in brush damage and can also lead to vehicle damage if the fibers become entangled and pull the brush core down upon the vehicle surfaces. While the brushes can be mounted to limit downward movement and insure that the upper brush shaft cannot reach a trunk and hood surface, such assurance is not available with respect to the elevated surfaces across the rear of a station wagon, where the possibility of entanglement is quite real.

To solve this difficulty, I have improved the basic apparatus by providing control devices to automatically lift the upper brush at one rear vehicle corner and hold the brush at an elevated position above that at which the vehicle is contacted during the full traverse of the vehicle rear surfaces. The process of washing the vehicle is modified by including the step of lifting the brush and holding it at an elevated condition across the rear of the vehicle, lowering the brush again prior to forward movement of the carriage. Since the upper brush extends at least to the centerline of the vehicle, all of the outer vehicle surfaces are contacted by the brush during longitudinal movement along the respective sides of the vehicle.

SUMMARY OF THE INVENTION

With respect to the apparatus, the invention resides in the improvement comprising a power-operated actuator for selectively lifting the horizontal brush above that elevation at which the vehicle surfaces are contacted thereby, together with automatic controls for effecting such movement and holding the brush at an elevated condition while the carriage moves transversely across the vehicle.

The process includes the steps of raising the horizontal brush adjacent one rear corner of the vehicle, holding the brush in its raised condition as the carriage moves transversely across the rear of the vehicle, and lowering the brush adjacent to the remaining rear vehicle corner and prior to forward movement of the carriage.

It is a first object of the invention to minimize undue wear on the horizontal brush of the basic apparatus combination, while insuring proper washing of all surfaces of a variety of passenger sedans and station wagons.

Another object of this invention is to make it practical to utilize a peripheral carwashing apparatus about a stationary vehicle without eliminating the ability to wash station wagons as well as sedans.

Another object of this invention is to automate the improved apparatus so as to automatically provide added protection to the washing devices with a minimum of added controls and equipment.

DESCRIPTION OF THE DRAWINGS

FIG. 1 is a plan view of the complete apparatus, illustrating a vehicle and progressive positions of the equipment in dashed lines;

FIG. 2 is a side elevation view of the apparatus illustrating the manner in which it passes across the rear of the vehicle;

FIG. 3 is a side elevation view of the apparatus illustrating the manner in which it proceeds along one side of a vehicle;

FIG. 6 is an enlarged fragmentary bottom view of the apparatus as seen along line 6—6 in FIG. 3, the retracted brush position being shown in dashed lines;

FIG. 7 is an enlarged front perspective view of the wheel guide and rail structure; and FIG. 8 is a simplified schematic view illustrating the electrical controls.

DESCRIPTION OF THE PREFERRED EMBODIMENT

Figure 4:
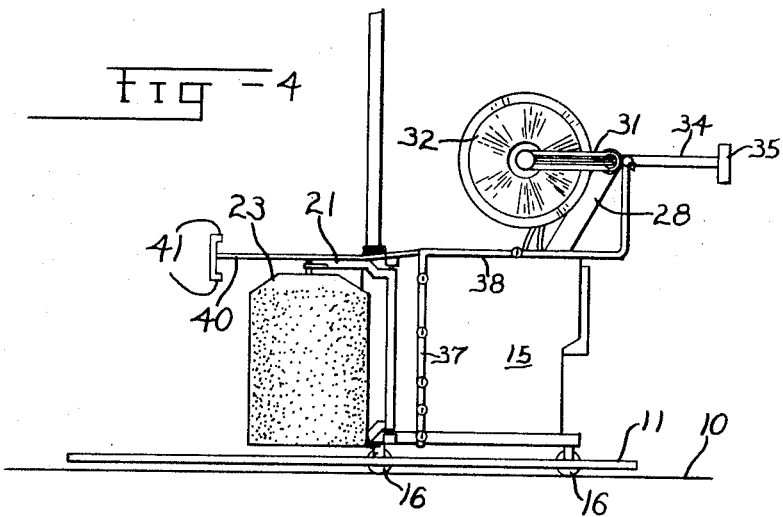
FIG. 4 is an elevation view of the apparatus as seen from the right in FIG. 2.

The apparatus and process described herein relates to an automatic washing arrangement for all passenger vehicles, including both sedan and station wagon models. It relates to that type of washing arrangement in which the vehicle is held stationary and powered brushes and sprays move about the periphery of the vehicle to engage and wash the vehicle surfaces.

It is designed to make practical the use of such an arrangement with all types of normal passenger vehicles, eliminating the usual problems of brush entanglement inherent in attempting to wash station wagons.

Taking the embodiment of the invention as illustrated hereon the carwashing machine is located on a supporting horizontal slab of concrete or other surfacing material. A peripheral guide rail 11 is mounted to slab 10 about an area on which a vehicle is located during washing operations. The vehicle itself is positioned by fixed longitudinal tire guides 12 within rail 11 and converging outer guides 13 on slab 10 outside the confines of rail 11 which lead to the guides 12. Transverse forward stops 14 serve to locate one front wheel of the vehicle along the guides 12. The general location of a vehicle is illustrated in FIG. 1 at 9.

The rail 11 serves as a guide for a moving carriage 15 supported on slab 10 by a pair of inner caster wheels 16 and a powered outer wheel 17. As can be seen in FIGS. 6 and 7 caster wheels 16 are provided with guide rollers 18 which engage the respective sides of the upright rail 11 and steer wheels 16 to direct carriage 15 about the path defined by rail 11. The weight of carriage 15 is not supported on rail 11, which serves merely as a steering guide for carriage 15. Carriage 15 is in fact mounted on slab 10 and not on the rail 11. A hydraulic motor 20 is drivingly connected to wheel 17. It selectively drives the carriage 15 about the peripheral path defined by rail 11.

Mounted along the inwardly facing surface of carriage 15 is a trailing frame 21, supported by upper and lower vertical bearings 22. The frame 21 rotatably supports a vertical brush 23 of the type having elongated bristles that extend radially outward and conform to the vehicle surfaces engaged thereby. A hydraulic motor 24 at the bottom of frame 21 is drivingly connected to the brush 23 (FIG. 6).

The position of frame 21 and brush 23 relative to carriage 15 is controlled by a swing arm 25 fixed to the lower end of frame 21. At one end, swing arm 25 is connected to a tension spring 26 anchored to carriage 15 (FIG. 6). At its remaining end, swing arm 25 is connected to a double acting cylinder assembly 27 are such that the cylinder is actuated by the application of hydraulic pressure at its outer end to thereby retract the cylinder piston rod in opposition to spring 26. When not so actuated, hydraulic pressure at both sides of the cylinder is released, and the cylinder assembly 27 does not oppose free movement of swing arm 25 as biased by spring 26. In normal washing operation, spring 26 serves to maintain brush 23 against the upright vehicle surfaces with a preset biasing force during complete peripheral movement of the carriage 15 about a vehicle.

Mounted at the top of carriage 15 is an upright standard 28. A horizontal pivot frame 31 extends inwardly from standard 28. Frame 31 is pivotally supported by a horizontal bearing assembly 30 fixed to the upper end of standard 28. The pivot frame 31 rotatably supports a horizontal brush 32 having a length that spans at least half of the area at which a vehicle is located within rail 11. A hydraulic motor 33 on frame 31 is drivingly connected to the brush 32.

Figure 5:
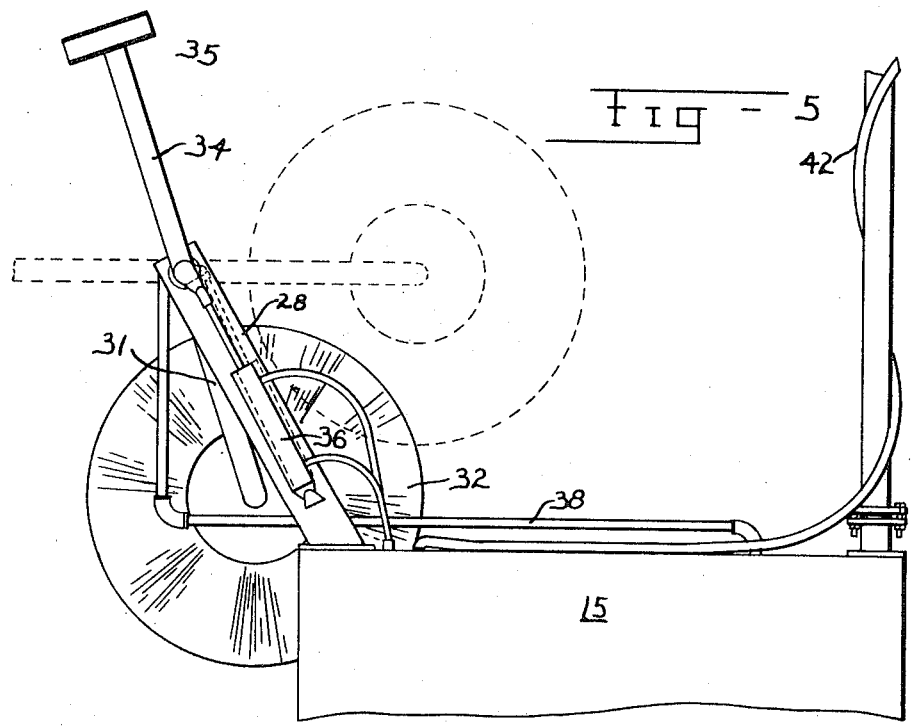
FIG. 5 is an enlarged fragmentary view taken along line 5—5 in FIG. 3, the raised brush position being shown in dashed lines.

The pivotal relation between brush 32 and carriage 15 is controlled by an upright lever 34 fixed to the outer end of frame 31 (FIG. 5). At one end lever 34 is provided with a counterweight 35. Its opposite end is pivotally connected to a cylinder assembly 36 mounted to the standard 28. The cylinder assembly 36 is a double-acting hydraulic unit. When actuated by the controls associated therewith, hydraulic pressure is applied to the inner end of the cylinder to thereby extend the cylinder piston rod and overcome the weight of frame 31 and brush 32. This serves to raise brush 32 to an elevation above that at which the vehicle surfaces are contacted thereby. During use of brush 32, pressure is released at both sides of cylinder assembly 36. The weight differential that exists between the brush and frame to one side of lever 34 and the counterweight 35 to its other side provides the chosen amount of brush pressure against the upper vehicle surfaces for proper cleaning contact.

The stroke of cylinder assembly 36 is such that brush 32 is limited in its amount of downward movement, the minimum elevation of brush 32 being such that the central shaft or brush core and supporting apparatus cannot contact the trunk or hood surfaces of a normal sedan. However, at this elevation the solid portions of the apparatus are located below the elevation of the automobile roof and below the elevation of the rear horizontal surfaces of a conventional station wagon.

Cleaning liquids are applied to the vehicle by means of an upright spray tube 37 located along the inside surfaces of carriage 15 and a horizontal spray tube 38 fixed to standard 28 and extending along the pivot frame 31 (FIG. 5). These tubes 37, 38 are provided with inwardly directed jets through which soap and water are sprayed immediately forward of the oncoming brushes 23 and 32. Trailing behind the vertical brush 23 are rinse jets 41 carried at the outer end of a supply tube 40 fixed to the upper portions of the upright pivot frame 21. The jets 41 supply rinse water to the vehicle surfaces after passage of both brushes. Water and soap are supplied to the respective tubes 37, 38 and 40 by electrically operated solenoid valves of conventional design. These valves are actuated at the beginning of a wash cycle and remain operative at all times during movement of carriage 15.

The carriage 15 is supplied with water and electricity from an upper central source at the center of slab 10 through a supply hose 42 and supply wires 43. The hose 42 is connected to an upright swivel supply connection and wires 43 are connected by means of sliding contact rings in the usual fashion.

The operation of the above apparatus and the improved method of washing all types of vehicles is best seen in FIGS. 1-3. In FIG. 1, the initial or starting position of the carriage 15 and brushes 23, 32 is illustrated in full lines. Carriage 15 begins movement from a location adjacent one rear corner of the vehicle to be washed. The vertical brush 23 is first moved inward from its position alongside carriage 15 and is held against the vehicle upright surface by the action of spring 26. The horizontal brush 32 initially is held at an elevation above that at which it contacts any vehicle surfaces, this position being shown in FIG. 2. Movement of carriage 15 is initially delayed to permit full contact of the vehicle by the vertical brush 23 and thereby eliminate any portion of the vehicle surface being missed due to premature movement of carriage 15.

Carriage 15 moves about the path defined by rail 11 and traverses the rear of the vehicle in the manner shown in FIG. 2. The general position of carriage 15 and the brushes as they begin movement across the rear of the vehicle is illustrated in FIG. 1 at "A.""B."

After traversing the rear of the vehicle, carriage 15 reaches a location adjacent the opposite rear corner of the vehicle and horizontal brush 32 is released by cylinder assembly 36 prior to forward movement of the brush 32 relative to the vehicle. At this time, the brush 32 contacts the upper vehicle surfaces at its rear end, and moving upwardly due to brush rotation and continues traveling along the vehicle in a straight path. The orientation of the apparatus along the vehicle side is shown in FIG. 1 at "B". By lifting brush 32 as it traverses the rear of the vehicle, any accidental engagement of the brush with accessories or devices at the rear corners of the vehicle is eliminated. This is particularly important when washing a station wagon, since engagement of deflectors or other devices at the rear of a station wagon might cause the brush 32 to be damaged or might result in the structural portions of brush 32 being brought downward into engagement with the vehicle surfaces.

The apparatus continues forwardly along the vehicle with both brushes 23 and 32 engaging the vehicle surfaces during washing and rinsing operations. Brush 32 is not raised during traversal of the front end of the vehicle, since protruding accessories are normally not encountered at the front of a vehicle and since the limits of movement imposed on horizontal frame 31 are such that the brush structure cannot be pulled downwardly to contact the vehicle surfaces at this lower elevation. The position of the apparatus across the front of the vehicle is shown in FIG. 1 at "C." Washing of the vehicle then continues with carriage 15 moving rearwardly back to its original position where brush 32 is lifted and brush 23 is retracted to thereby clear the vehicle.

The general details of a suitable control assembly for automatic operation of the apparatus are illustrated schematically in FIG. 8. A power source is shown at 44. It is controlled by a normally closed limit switch 46. Switch 46 is mounted to carriage 15 in the path of the upright pivot frame 21 (FIG. 7). It is opened when the vertical brush 23 is fully retracted. A manual switch 45 is normally open and is closed for a short duration of time at the beginning of each wash cycle. It can be coin controlled when desired.

A control unit 47 is illustrated to operate the motor 20 that propels carriage 15 about the slab 10. It is operated by a time delay relay 53 having normally open contacts wired in series with control unit 47 across the power source. The vertical brush control unit 48 that operates cylinder 27 in the manner described above is wired across the power source in series with one side of the double pull limit switch 51 that is normally closed and which is parallel to switch 45. The remaining side of switch 51 is wired in series with the relay 53. Thus, relay 53 and the control unit 48 are operated simultaneously by closing of switch 51 or by closing of switch 45. A second limit switch 52 is wired in series with a horizontal brush control unit 50 that operates cylinder assembly 36 as described above. A motor 57 is wired across the power source and operates the hydraulic pump that supplies hydraulic pressure to the units. Solenoid-operated water control valves 58 are similarly connected across the power source.

The switches 51, 52 are mounted at the bottom of carriage 15 (FIG. 7). Switch 51 is contacted at one rear corner of the unit by a floor stop 54 fixed to slab 10. Limit switch 52 is opened by contact with a stop 55 adjacent to the stop 54. It is closed by a second stop 56 at the opposite side of the apparatus (FIG 1).

Referring to FIG. 8, a cycle is initiated by closing of switch 45 either by manual effort or by a coinbox operation. This immediately completes the circuit to the vertical brush control unit 48. Closing of switch 45 also completes the circuit to relay 53. The closing of the relay contacts is delayed by a preset amount of time sufficient to insure contact of the vehicle surfaces by the rotating vertical brush 23. After closing of the relay contacts, the drive motor control unit 47 initiates movement of carriage 15 by actuation of motor 20. When such movement occurs, the double pull switch 51 clears the stop 54 and is then in a closed condition during the remainder of the washing cycle. The manual switch 45 can then be opened automatically following a preset delay.

Switch 52 is initially in an open condition, having been set by contact with floor stop 55. It remains in this opened condition during movement of the unit across the rear of the vehicle and until stop 56 contacts switch 52 at the opposite rear corner of the vehicle. At such time, a circuit is completed across horizontal brush control unit 50, which is then actuated to free the horizontal brush 32 and permit it to be lowered by gravity onto the vehicle surfaces.

At the conclusion of the washing cycle and following one complete movement of carriage 15 about rail 11, floor stops 54 and 55 engage the switches 51 and 52 respectively. This results in opening the circuits to relay 53 and the brush control 48, 50. The brushes are moved away from the vehicle and carriage 15 is thereby stopped. After full retraction of the vertical brush 23, frame 21 will contact the normally closed switch 46, and thereby open the electrical circuit to the entire apparatus. The unit is thus ready for a succeeding vehicle.

It is to be stressed that the schematic diagram shown at FIG. 8 is purely schematic. It is believed to be within the skill of one in this field to utilize this general arrangement in connection with conventional control devices, adding other control switches and sensing devices as required. For example, it is desirable to provide a pressure-operated mat (not shown) which would be contacted by the located front wheel of a vehicle when in place, so that the vehicle must be in proper position before the washing apparatus can be actuated by manual control.

Modifications can be made in the precise structure of the apparatus without deviating from the basic concept of this improvement as it relates to the control elements and method of washing.

Having thus described my invention, I claim:

1. In an automatic washing facility for vehicles having a mobile unit that moves around the vehicle spraying a cleaning fluid onto the vehicle while a horizontally movable rotating side brush engages the side, back and front surfaces of the vehicle and a vertically movable rotating overhead brush engages the top surfaces of the vehicle; an actuator for raising the overhead brush to an up position and a control means responsive to the movement of the mobile unit along the rear of the vehicle and operatively connected to the actuator for operating the actuator to raise the overhead brush as the mobile unit moves along the rear of the unit.

2. An automatic washing facility for vehicles, particularly comprising:
 a floor surface for supporting the vehicle;
 an elongated continuous guide track fixed to the floor surface surrounding and spaced from the vehicle;
 a mobile unit supported by the floor surface and guided by the guide track for moving around the vehicle during each washing operation;
 a side frame pivotally mounted on the mobile unit for pivotal movement about a substantially vertical axis;
 an upright side brush rotatably mounted on the side frame for engaging the rear, side, and front surfaces of the vehicle as the unit moves around the vehicle
 a overhead frame pivotally mounted on the mobile unit for pivotal movement about a substantially horizontal axis;
 a horizontal brush rotatably mounted on the overhead frame for engaging the top surfaces of the vehicle as the unit moves around the vehicle;
 an actuator mounted on the unit operatively connected to the overhead frame for holding the horizontal brush in an elevated position, and
 control means responsive to the movement of the mobile unit along the rear of the vehicle for operating the actuator to hold the horizontal brush in the elevated position as the unit moves along the rear of the vehicle.

3. An automatic washing facility as defined in claim 2 which further comprises a drive means mounted on the unit for propelling the unit around the vehicle in a selected direction and wherein the control means operates the drive means to stop and start the movement of the mobile unit adjacent one rear corner of the vehicle so that the mobile unit will first move along the rear of the unit before moving along the front of the vehicle during each washing operation and wherein the control means operates the actuator to move the horizontal brush to the elevated position when the unit stops and maintains the horizontal brush in the elevated position at the start and until the unit rounds the other rear corner of the vehicle.

* * * * *